(12) United States Patent
Lübbert et al.

(10) Patent No.: US 11,945,566 B2
(45) Date of Patent: Apr. 2, 2024

(54) DRAIN MAST

(71) Applicant: Airbus Operations GmbH, Hamburg (DE)

(72) Inventors: Tim Lübbert, Hamburg (DE); Michael Rempe, Hamburg (DE); Frank Schneider, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/851,189

(22) Filed: Jun. 28, 2022

(65) Prior Publication Data
US 2023/0002028 A1    Jan. 5, 2023

(30) Foreign Application Priority Data

Jun. 28, 2021 (EP) .................................. 21182209

(51) Int. Cl.
*B64C 1/14* (2006.01)
*F16L 53/38* (2018.01)
*H05B 3/48* (2006.01)

(52) U.S. Cl.
CPC ............ *B64C 1/1453* (2013.01); *F16L 53/38* (2018.01); *H05B 3/48* (2013.01)

(58) Field of Classification Search
CPC .................................................. B64C 1/1453
See application file for complete search history.

(56) References Cited

U.S. PATENT DOCUMENTS

| 5,552,576 | A | * | 9/1996 | Giamati | ................. | B64D 11/02 244/136 |
| 2005/0230547 | A1 | * | 10/2005 | Giamati | ................. | B64D 11/02 244/129.1 |

(Continued)

FOREIGN PATENT DOCUMENTS

| DE | 102009014985 A1 | * | 11/2010 | ............. | B29C 65/02 |
| DE | 102019116435 A1 | * | 12/2020 | | |

(Continued)

OTHER PUBLICATIONS

European Search Report for Application No. 21182209 dated Dec. 7, 2021.

*Primary Examiner* — Philip J Bonzell
*Assistant Examiner* — Anna L. Gordon
(74) *Attorney, Agent, or Firm* — KDW Firm PLLC

(57) ABSTRACT

A drain mast for an aircraft for discharge of water from the aircraft interior with a line which extends in a line direction from a connector end to a discharge end. The connector end can connect to another line in the interior of the aircraft, through which further line water flows into the drain mast. The discharge end can discharge water into a surrounding area of the aircraft. The line includes a plastic, into which a conductive material is embedded, by which the line can be heated electrically, by a heating current being conducted through the conductive material. A proportion of the embedded conductive material in the line increases in the line direction per length unit from the connector end of the line towards the discharge end such that the heating power which is introduced into the line per length unit increases from the connector end towards the discharge end.

7 Claims, 2 Drawing Sheets

(56) References Cited

U.S. PATENT DOCUMENTS

| | | | | |
|---|---|---|---|---|
| 2006/0249628 A1* | 11/2006 | Turner | ............... | B64C 1/1453 244/129.1 |
| 2015/0075662 A1* | 3/2015 | Lee | .................. | B64C 1/1453 29/428 |
| 2015/0329195 A1* | 11/2015 | Wielgosz | ............ | B64C 1/1453 137/1 |

FOREIGN PATENT DOCUMENTS

| | | |
|---|---|---|
| EP | 0 556 765 A1 | 8/1993 |
| EP | 0 654 402 A1 | 5/1995 |
| EP | 0 672 583 A1 | 9/1995 |

* cited by examiner

DRAIN MAST

CROSS-REFERENCE TO RELATED APPLICATION

This application claims priority to EP Application No. 21182209.3 filed Jun. 28, 2021, the entire disclosure of which is incorporated by reference herein.

TECHNICAL FIELD

The disclosure herein relates to a drain mast for an aircraft, by way of which drain mast water can be discharged from the aircraft interior. The drain mast comprises a line which extends in a line direction from a connector end to a discharge end. The connector end is provided for connection to a further line in the interior of the aircraft, through which further line water flows into the line of the drain mast. The discharge end is provided for the discharge of the water into a surrounding area of the aircraft.

BACKGROUND

Drain masts are used to discharge grey water from the basins/sinks of bathrooms and galleys out of the aircraft. The drain masts run directly outboards, that is to say into the surrounding area of the aircraft. In order that contamination of the aircraft outer skin by way of contaminated grey water does not occur, the discharge ends of the drain masts are not recessed directly into the outer skin of the aircraft, but rather protrude out of the outer skin and are provided with an aerodynamic cowling, a fairing.

During the flight, the temperature at the discharge end or outer end of the drain mast drops to the ambient temperature. This can be up to −70° C., for example, at a cruising altitude of 10,000 m. In the case of temperatures of this type, it is not possible to allow water to discharge simply through the drain mast, since the water would immediately freeze and would therefore clog the discharge, that is to say the line in the drain mast. It is therefore known for drain masts to be heated. To this end, the lines of the drain masts which are manufactured, for example, from stainless steel are provided with heating foils and a layer above them made from an insulating material, with the result that the line can be heated. Since the heating foils cannot be installed as far as the discharge end, the latter is provided, for example, with a copper collar which absorbs heat transmitted via the metallic line.

SUMMARY

Against this background, a person skilled in the art is confronted with the object of providing an improved drain mast.

This object is achieved by a drain mast as disclosed herein. Preferred refinements are disclosed herein.

In a first aspect, the disclosure herein relates to a drain mast for an aircraft for the discharge of water from the aircraft interior with a line which extends in a line direction from a connector end to a discharge end and surrounds an interior space. The connector end is provided for connection to a further line of the aircraft, through which further line water flows into the interior space of the line. The discharge end is provided for the discharge of the water out of the interior space of the line into a surrounding area of the aircraft. The line comprises a plastic, into which an electrically conductive material is embedded, by which the line can be heated electrically, by a heating current being conducted through the conductive material. A proportion of the embedded conductive material in the line increases in the line direction per length unit from the connector end of the line towards the discharge end in such a way that the heating power which is introduced into the line per length unit increases from the connector end towards the discharge end.

In other words, a drain mast is provided, by way of which water and, in particular, grey water from the basins/sinks of an aircraft can be discharged from the aircraft. The drain mast can be used, for example, to conduct water from the basins/sinks in the galleys and bathrooms of the aircraft out of the aircraft during the flight, with the result that the water does not have to be transported further.

The water can run via one or more lines through the interior space of the aircraft before it flows, for example, at the outer skin out of these inner lines via a coupling into the line of the drain mast. The drain mast can be connected by way of its inner connector end via an example coupling to an inner line. From there, the water flows through an interior space of the line of the drain mast, before it is discharged at the outer discharge end of the line into the surrounding area of the aircraft.

The line of the drain mast is formed from a plastic, into which an electrically conductive material for heating the line is embedded, with the result that they are formed from one piece. The line can have, for example, a circular, oval or rectangular cross section, and runs in a line direction between the inner connector end and the outer discharge end. The course of the line can follow a straight line or can be curved.

The electrically conductive material is embedded in the plastic material, that is to say it is enclosed by the plastic material, from which the line is formed, at least on three sides and preferably completely. In the present case, a plastic material is understood to mean, for example, polyetheretherketone (PEEK), but it can also be fiber-reinforced plastics. For example, the line can be formed from a glass fiber-reinforced plastic.

The electrically conductive material is preferably carbon fibers which are possibly also used to reinforce the plastic. Since the electrically conductive material is embedded completely into the plastic of the line, no water can penetrate between the conductor and the line. In this way, damage of the drain mast and specifically of the heating elements, formed by the electrical conductors, and the lines caused by penetrating water such as, for example, condensation water is avoided in an advantageous way, since the line and the heating elements are configured in one piece.

In an alternatively preferred embodiment, the heating elements are an electrically conductive material with a positive temperature coefficient, that is to say a material, the resistance of which decreases as the temperature drops and increases as the temperature rises. Materials of this type can also be called PTC materials. They have the advantage that the heating power rises automatically in the case of a dropping ambient temperature, since the conductor has to be heated to a more pronounced extent in order to maintain the temperature, and the heating power drops in the case of a rising ambient temperature, with the result that a self-regulating/self-limiting heating system is formed.

A current can be applied to the conductive material, in order to heat the line. This current is called a heating current. To this extent, for example, two or more connectors can be provided, at which the electrically conductive material can be connected to one or more current or voltage sources.

The distribution of the embedded electrically conductive material within the line is not homogeneous. Rather, the proportion of electrically conductive material per length unit increases from the connector end towards the discharge end, with the result that, in the case of an identical heating current, the heating power increases from the connector end towards the discharge end. The rise has to be neither constant nor continuous. Rather, the electrically conductive material is distributed in a preferred way such that, for example, a constant temperature of the line is achieved in cruise flight. Therefore, the heating power has to conversely run proportionally with respect to the temperature profile along the line in the case of an un-heated line.

In this way, a particularly light and energy-efficient drain mast is provided in an advantageous way, which drain mast is not formed from heavy metal, but rather from a light plastic. In addition, a heating unit can be realised by way of the embedded electrical conductors, which heating unit heats the line of the drain mast accurately where the heat is required. Here, the heating power can be adapted from the connector end as far as the discharge end directly by way of the proportion of the conductive material in the plastic of the line. It is therefore not necessary for the line to be heated locally in a more pronounced manner than is absolutely necessary, since, unlike in the case of conventional drain masts, the heating power can be introduced directly into the line as far as the discharge end, whereas the heating elements could be applied to the line only up to a certain spacing from the discharge end in the prior art on account of structural limitations, and the remaining sections had to be heated indirectly with the aid of thermal conductivity of the metallic line.

In one preferred embodiment, the drain mast comprises an aerodynamic cowling with a discharge opening, the discharge end of the line being arranged in the discharge opening. It is particularly preferred here if the aerodynamic cowling and the line are configured in one piece. It is thus prevented in a preferred way that water can penetrate between the cowling and the line and can damage individual elements of the drain mast, since all the components have been manufactured in one piece and the electric conductors for heating have been embedded into the plastic. The single-piece configuration additionally makes it possible for production to be automated to a more pronounced extent, as a result of which costs can be lowered and production errors can be decreased.

In one preferred embodiment, the surface which delimits the interior space of the line is formed from a plastic. The surface made from plastic can be, for example, a plastic layer, that is to say a layer which consists of or comprises a plastic, which forms the inner cowling of the surface, and which, in particular, protects heating elements embedded into the plastic against the grey water which flows through the line, and is also, in particular, less susceptible to corrosion as a result of the contact with the grey water.

In a second aspect, the object is achieved by way of an aircraft with a drain mast in accordance with one of the above-described embodiments. The advantages of the aircraft correspond in each case to the advantages of the drain mast which is used in the aircraft.

BRIEF DESCRIPTION OF THE DRAWINGS

In the following text, the disclosure herein will be described in greater detail with reference to the drawings, in which.

DETAILED DESCRIPTION

Figure 2:
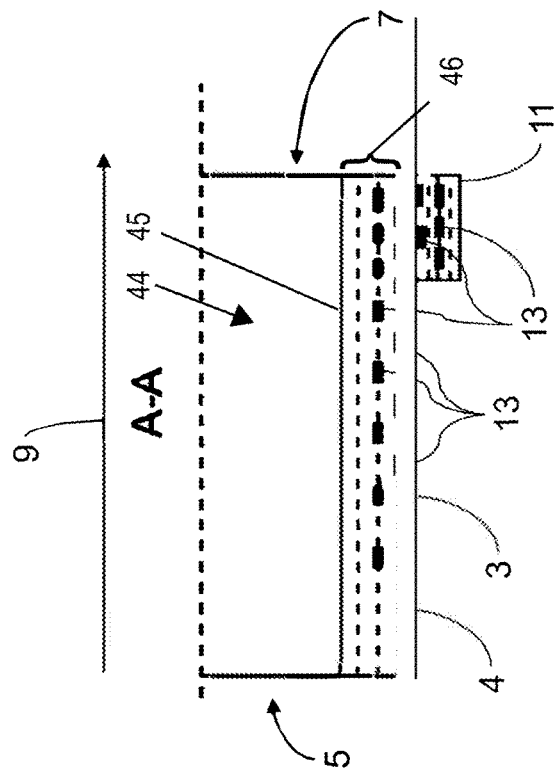
FIG. 2 shows a cross section through a side wall of the example embodiment from FIG. 1 along the line A-A.
Figure 1:
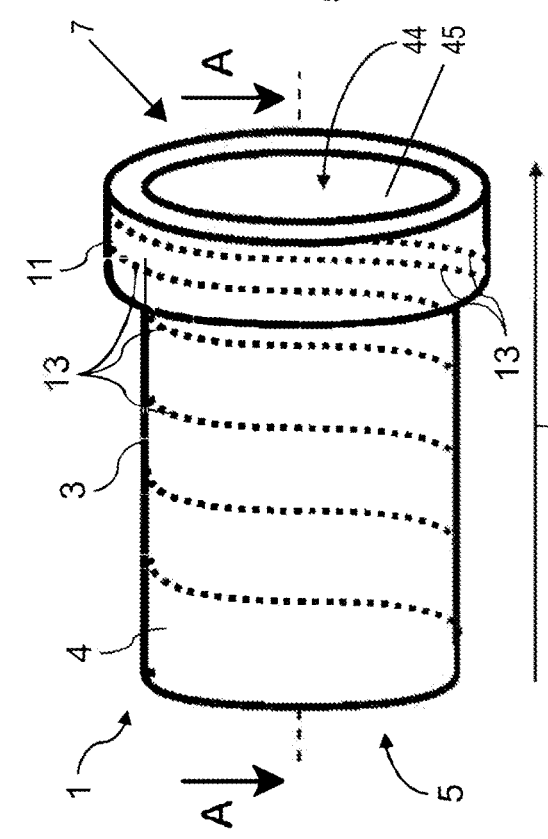
FIG. 1 shows a perspective view of one example embodiment of a drain mast.

FIGS. 1 and 2 show one example embodiment of a drain mast 1, by way of which water can be discharged from an aircraft into the surrounding area of the aircraft. The water is grey water from the basins/sinks of the bathrooms or galleys of the aircraft.

The drain mast 1 comprises a line 3 which extends in a line direction 9 between an inner end or connector end 5 and an outer end or discharge end 7. FIG. 2 shows a section through an outer wall 4 of the line 3.

In the example embodiment in FIG. 1, the line 3 has an annular cross section perpendicularly with respect to the line direction 9, and runs substantially in a straight line. The line 3 encloses an interior space 44 which is delimited by an inner face or inner surface 45. The connector end 5 is provided to be connected to a further line (not shown), from which the grey water flows into the interior space 44 of the line 3. The connection between the lines can take place within the aircraft, directly on the outer skin of the aircraft or else outside the aircraft fuselage, for example protected by way of an aerodynamic cowling (not shown in FIG. 1). After it has passed through the interior space 44 of the line 3, the grey water is discharged through the discharge end 7 into the surrounding area of the aircraft.

In the example embodiment in FIG. 1, the line 3 has a collar 11 which delimits the line 3 towards the discharge end 7 and serves as a mechanical interface to an aerodynamic cowling (not shown in FIG. 1), the fairing. The line 3 is formed substantially from a plastic, which, in the present example embodiment, is a plastic such as, for example, polyetheretherketone (PEEK).

In particular, the surface 45 which delimits the interior space 44 of the line 3 consists of or comprises a plastic, with the result that the grey water which flows through the line 3 comes into contact exclusively with plastic while it flows through the line 3. The plastic is particularly resistant to the grey water which can damage metallic lines, in particular. In the example embodiment in FIGS. 1 and 2, the inner face is formed by a plastic layer 46, the density or thickness of which is optimized with regard to the robustness of the line and as high an input of thermal energy as possible.

In addition, electrical conductors 13 which run in windings around the line 3 are embedded into the plastic. The electrical conductors 13 are provided in FIGS. 1 and 2 only partially with reference numerals, in order not to overload the illustration in the figures. The line 3 can be heated via the electrical conductors 13. As can be seen, in particular, in FIG. 2, the proportion of the electrical conductors per length unit or their density increases in the line direction 9 from the connector end 5 towards the discharge end 7, with the result that the heating power which is introduced into the line likewise increases from the connector end 5 towards the discharge end 7. The line 3 and the heating element which is formed by the electrical conductor 13, which can also be in multiple pieces, are configured in one piece, with the result that the heating elements are protected against moisture by way of the line material and no moisture can pass between the heating element and the line 3. As a result, the line 3 and the conductive material 13 are protected against damage, for example as a result of corrosion.

Figure 3:
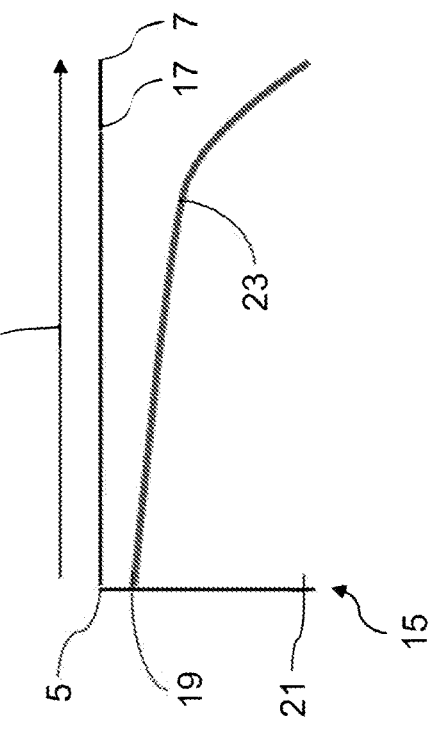
FIG. 3 shows a temperature profile of an unheated drain mast at cruising altitude.

FIG. 3 shows an example diagrammatic temperature profile along the line 3, which temperature profile would be set at a cruise height of 10,000 m in an unheated drain mast 1. In FIG. 3, the temperature is plotted on the ordinate 15, and the length of the line 3 from the connector end 5 to the discharge end 7 is plotted on the abscissa 17. The curve 23 diagrammatically shows the profile of the temperature which has an inlet temperature 19 of approximately −15° C. at the connector end 5 and drops up to an outlet temperature 21 at the discharge end of approximately −70° C., the drop not running in a linear manner.

Figure 4:
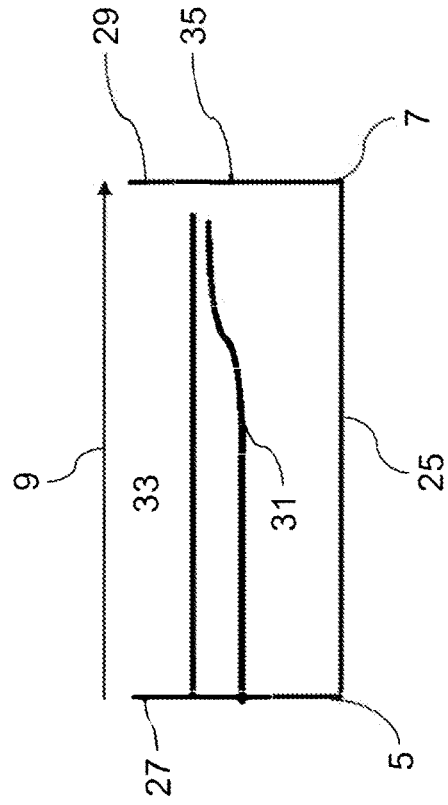
FIG. 4 shows a temperature profile and a heating power of the example embodiment from FIGS. 1 and 2 at cruising altitude.

FIG. 4 shows the temperature profile of the line 3 from the example embodiment of FIGS. 1 and 2 if the line 3 is heated by the electrical conductors 13. Here, the length of the line 3 from the connector end 5 to the discharge end 7 is once again plotted on the abscissa 25, whereas the left-hand ordinate 27 shows the heating power which is introduced into the line, and the right-hand ordinate 29 shows the temperature 29. The curve 31 shows the profile of the heating power along the line 3, while the curve 33 shows the profile of the temperature in the line 3 in the case of the heating system being switched on. As can be seen directly in FIG. 4, the heating power 31 which is introduced into the line 3 increases from the connector end 5 towards the discharge end 7, while the temperature 33 advantageously remains substantially constant and, in particular, above the temperature of 0° C. which is marked by way of the reference numeral 35 on the right-hand ordinate. This is advantageously achieved by way of the electrical conductors 13 which are embedded in the line wall and the proportion of which per length unit increases continuously from the connector end 5 towards the discharge end 7. In this way, a drain mast 1 can be provided which is heated homogeneously and therefore in an energy-efficient manner. In addition, the line 3 and the electrical conductors 13 which are embedded therein are manufactured from one piece, with the result that no water can penetrate between the heating elements, formed by the electrical conductors or the conductive material 13, and the line 3 and can damage the drain mast 1.

In order to ensure a sufficiently high temperature on the inner face 45 of the line 3 and, at the same time, to keep the required heating power as low as possible, the plastic layer 46 which forms the inner face is configured to be as thin as possible. It has to be ensured here, however, that the plastic layer 46 is still sufficiently thick to be sufficiently robust against possible mechanical effects.

Figure 5:
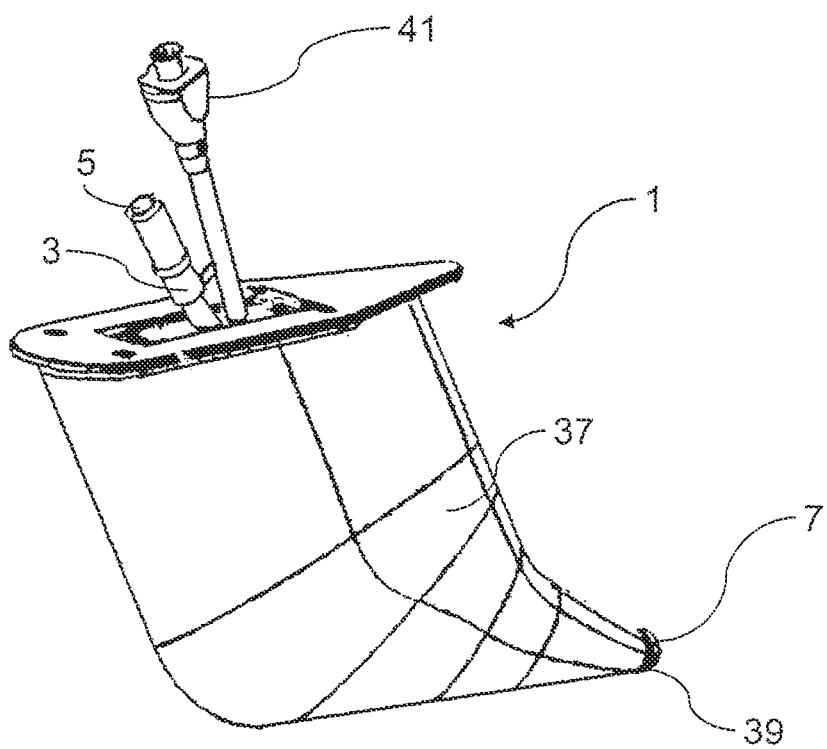
FIG. 5 shows one example embodiment of a drain mast with an aerodynamic cowling.

FIG. 5 shows a second example embodiment of a drain mast 1, in the case of which the line 3 is embedded in an aerodynamic cowling 37. Of the line 3, there is principally the connector end 5 with the directly adjoining part of the line 3, and the discharge end 7 which protrudes from a discharge opening 39 out of the aerodynamic cowling 37. In addition, the drain mast 1 has a connecting element 41, by way of which an electrical connection to the electrical conductors 13 which are embedded in the line 3 can be established, in order to supply them with current and to heat the line 3. The line 3 and the aerodynamic cowling 37 are preferably manufactured from one piece, that is to say the aerodynamic cowling 37 is manufactured from the same material as the line 3. This can prevent water from penetrating into the cowling, which can lead to damage. In addition, manufacturing can be automated to a more pronounced extent, which lowers the costs.

Figure 6:
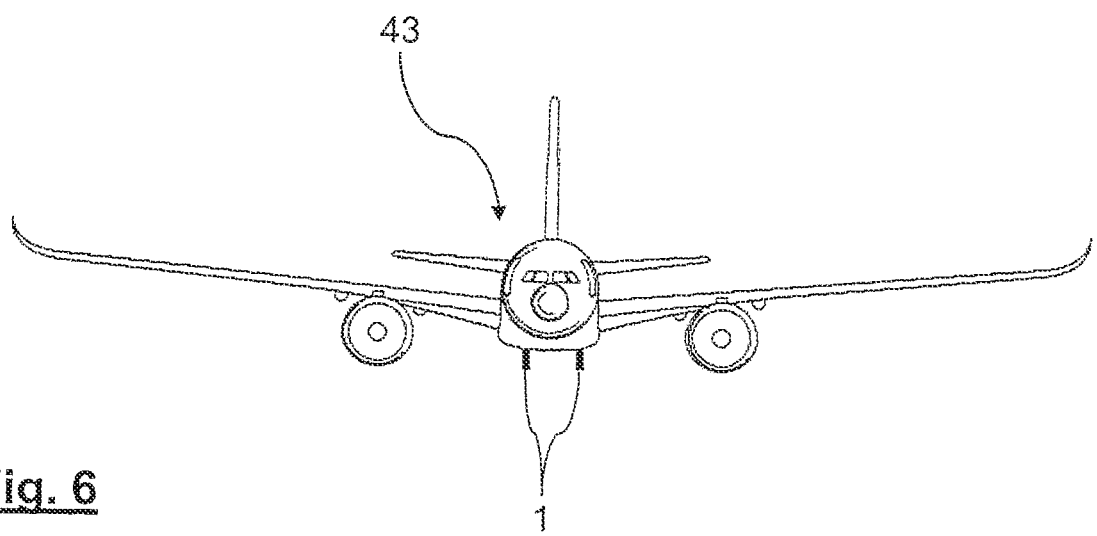
FIG. 6 shows one example embodiment of an aircraft.

Finally, FIG. 6 shows one example embodiment of an aircraft 43 with two example embodiments of drain masts 1. The advantages of the aircraft correspond to the advantages of the drain masts 1 which are used therein.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A drain mast for an aircraft for discharge of water from an interior of the aircraft with a line which extends in a line direction from a connector end to a discharge end and surrounds an interior space,
    the connector end being configured for connection to a further line in the interior of the aircraft, through which connector end water flows into the interior space of the line, and the discharge end being configured for the discharge of the water out of the interior space into a surrounding area of the aircraft,
    the line comprising a plastic, into which an electrically conductive material is embedded, by which the line can be heated electrically, by a heating current conducted through the electrically conductive material, and
    a proportion of the electrically conductive material embedded in the line increasing in the line direction per length unit from the connector end of the line towards the discharge end such that heating power introduced into the line per length unit increases from the connector end towards the discharge end;
    wherein the drain mast comprises an aerodynamic cowling with a discharge opening, the discharge end of the line being arranged in the discharge opening, wherein the aerodynamic cowling and the line are configured in one piece.

2. The drain mast according to claim 1, wherein the electrically conductive material has a positive temperature coefficient.

3. The drain mast according to claim 1, wherein the electrically conductive material comprises carbon fibers.

4. The drain mast according to claim 1, wherein the line comprises a fiber-reinforced plastic.

5. The drain mast according to claim 1, wherein the line comprises polyetheretherketone, PEEK.

6. The drain mast according to claim 1, wherein a surface which delimits the interior space of the line is plastic.

7. An aircraft with a drain mast according to claim 1.

* * * * *